United States Patent [19]

Sullivan

[11] 4,116,057

[45] Sep. 26, 1978

[54] PENDULOUS INDUCTION COMPASS TRANSMITTER WITH MEANS TO COMPENSATE FOR HEADING ERRORS IN TURNS DUE TO THE VERTICAL COMPONENT OF THE EARTH'S MAGNETIC FIELD AND DUE TO TWO CYCLE ERROR

[76] Inventor: Gerald Leslie Sullivan, 24 Scollay Cir., Salem, Rockingham, N.H. 03079

[21] Appl. No.: 752,265

[22] Filed: Dec. 20, 1976

[51] Int. Cl.$^2$ .............................................. G01C 21/00
[52] U.S. Cl. .................................. 73/178 R; 33/356; 318/633; 324/224; 324/225; 324/246
[58] Field of Search ................. 33/326, 356, 357, 361; 73/178 R; 235/150.25, 150.26, 186; 244/175, 179; 318/629, 633, 647, 655, 661; 340/197, 347 SY; 324/43 R, 47

[56] References Cited

U.S. PATENT DOCUMENTS

| | | | |
|---|---|---|---|
| 2,852,859 | 9/1958 | Depp | 33/356 X |
| 3,678,593 | 7/1972 | Baker et al. | 33/361 |
| 3,939,572 | 2/1976 | Erspamer | 33/361 |
| 4,006,631 | 2/1977 | Garner | 33/356 X |

*Primary Examiner*—Stephen G. Kunin

[57] ABSTRACT

The invention relates to an apparatus for compensating the output of a pendulous induction compass transmitter to eliminate heading errors during turns due to the vertical component of the Earth's magnetic field as well as those due to the horizontal component of the Earth's magnetic field perpendicular to the axis of tilt. By compensating for the effects of the Earth's vertical field component, instabilities and anomalies such as "Northerly Turning Error" are eliminated or minimized. Compensation for vertical field error is provided by generating a signal proportional to the product of the Earth's magnetic field M, the sine of the magnetic dip angle D at the given latitude and the sine of the aircraft tilt or bank angle $\phi$. A compensating signal proportional to $\cos \phi$ is generated and used to compensate for two cycle error. These compensating signals are used to drive current through the transmitter windings to produce flux which opposes and cancels the flux sensed by the windings of the compass transmitter due to the vertical component of the Earth's field and which corrects that due to the horizontal component of the Earth's field which is perpendicular to the roll axis during turns. Since the magnitude of bank angle $\phi$ or its trigonometric function $\sin \phi$ and $\cos \phi$ can be readily obtained from the aircraft vertical roll gyroscope and dip angle D is known for any latitude and longitude, these two compensating signals can be easily generated and applied to the compass transmitter to achieve the desired result.

4 Claims, 3 Drawing Figures

PENDULOUS INDUCTION COMPASS TRANSMITTER WITH MEANS TO COMPENSATE FOR HEADING ERRORS IN TURNS DUE TO THE VERTICAL COMPONENT OF THE EARTH'S MAGNETIC FIELD AND DUE TO TWO CYCLE ERROR

The instant invention relates to a magnetic heading reference system and more particularly, to one utilizing a pendulous induction compass transmitter which is compensated within the transmitter to minimize or eliminate heading errors during turns.

Normally, the heading output from aircraft compass systems is obtained from a directional gyro whose heading is slowly corrected to agree with the heading provided by an induction compass transmitter. This type of directional and heading output system is complementary in that the short term stability and accuracy of the gyroscope is combined with the long term accuracy of the compass transmitter so that the overall system incorporates the best features of each. One class of compass transmitters used as aircraft magnetic heading references are pendulous in order to assure that the sensing elements (magnetometer windings) remain horizontal during non-accelerating straight flight within the pendulous tilt freedom of the device (which may normally be in the range of ±27°). Under these conditions, the induction compass properly senses the horizontal component of the Earth's magnetic field and is insensitive to the vertical component of the Earth's field. The horizontal component, H, of the Earth's magnetic field M can be resolved along the aircraft fore and aft (roll) the athwartships (pitch) axes so that the heading indicated by the compass transmitter is represented by the arc tangent of the athwartships component $H_p$ of the Earth's magnetic field divided by the fore/aft component $H_R$, as sensed in plane of the sensing elements.

However, because of the pendulous suspension, the compass transmitter is susceptible to tilt during turns and during linear acceleration. This, in turn, produces errors in the sensed direction of the magnetic north and in indicated heading. That is, any acceleration due to speed changes, or the centripetal acceleration imposed during a turn, causes the plane of the sensing elements of the compass transmitter to be displaced from the horizontal. Thus, in the case of a coordinated turn, the pendulous element assumes a lateral tilt angle which agrees with the bank angle of the aircraft. Because of this tilting of the plane of the compass transmitter, not only is the sensed horizontal component normally reduced, but, in addition, a component of the Earth's vertical field is sensed. This sensed vertical component adds vectorially to the sensed Earth's horizontal field component and, in the general case, results in an erroneous sensing of magnetic North.

This tilt of the compass transmitter sensing element produces errors from the combination of two causes:

One of these errors is a two cycle error which is developed whenever there is a component of the Earth's horizontal magnetic field perpendicular to the axis of tilt together with a component along the axis of tilt. The perpendicular component is reduced in magnitude by a function of the angle of tilt when projected onto the plane of the sensing coil. This reduced component when recombined with the unchanged horizontal component along the axis of tilt produces an apparent vectorial shift in the sensed direction of the field in the plane of the sensing winding. This two cycle error is thus a function of both the heading angle and the angle of tilt. It has the same magnitude for all magnetic field dip angles D and is normally small.

The other tilt induced error occurs because the vertical component of the Earth's magnetic field projects onto the plane of the tilted winding and vectorially adds to the sensed horizontal component. This vertical field error, however, varies with magnetic field dip angle D and, as a result, can vary widely. Tilt about the aircraft roll axis during turns causes this second error source to produce what is termed "Northerly Turning Error" and can induce heading anomalies and ambiguities as well as continuous oscillation when attempting to straighten out on a northerly heading when in the Northern Hemisphere and similarly, when attempting to straighten out on a southerly heading in the Southern Hemisphere. The nature of this error which is due to the vertical component of the Earth's magnetic field may be more clearly understood by considering the following:

Assume that an aircraft using a pendulous induction compass transmitter as a heading reference is in a coordinated right turn and attempts to level out on a North heading. The pendulous transmitter tilts with the same right wing down bank attitude as the aircraft itself. When on a North heading, a portion of the Earth's vertical field vector now passes from West to East in the plane of the compass transmitter, vectorially adding to the actual sensed horizontal component and making it appear that North is to the East of its actual location. Consequently, the aircraft continues to turn beyond North before levelling off. Once level, North is correctly indicated to the West, and the aircraft must go into a left bank for heading correction. A portion of the Earth's vertical field vector now passes from East to West in the plane of the transmitter and is added vectorially before to the actual horizontal component in an opposite sense thereby making it appear that North is to the West of its actual direction. Again, the aircraft continues to turn beyond North before levelling off. This situation continues to repeat making it virtually impossible to obtain or maintain the desired constant North heading.

It is customary in existing slaved aircraft compass systems, to disconnect compass slaving during turns in order to avoid this oscillating condition about the northerly heading. This vertical field error also often causes the aircraft compass mode of operation (available on some compass systems for emergency use when the directional gyro fails) to become literally useless during turns unless dip angle is relatively small. Since the dip angle in the middle of the Continental U.S. is approximately 70°, it can be seen that this is a serious problem in aircraft navigation.

In a recently filed application entitled "Pendulous Induction Compass Transmitter with Means to Compensate for Heading Errors in Turns Due to the Vertical Component of the Earth's Magnetic Field," Ser. No 729,135 Filed: Oct. 4, 1976 in the name of Gerald Leslie Sullivan, which application is assigned to the General Electric Company, the assignee of the present invention, a system for compensating a pendulous compass transmitter is described in which a DC compensating signal proportional to the vertical field error is generated and utilized to drive a current directly through the sensing windings of the compass transmitter to generate flux which cancels the sensed flux field due to the vertical component of the Earth's field during vehicle turns. In the arrangement described in the above identified Sullivan application, the compensating signal is generated without having to sense the vertical field directly. It is generated by producing a signal which is proportional to the product of the Earth's magnetic field M, the sine of the known magnetic field dip angle D and the sine of the tilt or bank angle $\phi$. This signal, M sin D sin $\phi$ is exactly equal to the induced vertical field error V sin $\phi$ and when driven through the sensing or auxiliary windings generates a flux which cancels the flux sensed during a turn due to the vertical field. The output from the induction compass transmitter during a turn is thus essentially free of errors due to the vertical component of the Earth's magnetic field thereby minimizing or eliminating hemispherical turn errors or anomalies of the type usually referred to as "Northerly Turning Errors." This, in turn, makes it possible to use the magnetic compass for heading purposes without the need for a directional gyroscope.

While the arrangement described in the aforesaid Sullivan application is very effective in compensating for heading errors due to the vertical component of the Earth's magnetic field during turns, it does not compensate for the so-called two cycle error which is due to the horizontal component of the Earth's magnetic field perpendicular to the axis of tilt. In most instances, as pointed out in the aforesaid Sullivan application, the two cycle error is ignored since it is small compared to the error due to the vertical component of the Earth's field which varies with dip angle D which, in turn, varies with latitude. However, in some instances, it may be desirable to compensate the output signal from the induction compass transmitter to eliminate not only heading errors due to the vertical field component, but also to eliminate two cycle error.

It is therefore a principal objective of the invention to provide an arrangement for compensating a pendulous induction compass transmitter to eliminate heading errors during turns caused by the vertical component of the Earth's magnetic field and to compensate for two cycle errors caused by the horizontal component of the Earth's magnetic field.

Another objective of the invention is to provide a compensated, pendulous induction compass transmitter in which heading errors caused by the vertical component of the Earth's magnetic field as well as two cycle error caused by the horizontal component of the Earth's magnetic field are cancelled within the compass transmitter windings.

Other objectives and advantages of the instant invention will become apparent as the description thereof proceeds.

In accordance with one aspect of the invention, a vertical field error compensating signal is generated (without sensing the vertical field directly) from dip angle D at a given latitude, the Earth's magnetic field M and the bank angle $\phi$.

That is, the compensating signal is made proportional to M sin D sin $\phi$ and is equal to the vertical field error V sin $\phi$. The compensating signal generates current which is fed back through the windings which sense the athwartships component of the Earth's field to produce a flux which cancels the effect of the vertical component of the Earth's magnetic field on these windings when the induction compass transmitter is tilted during turns. To this end, the second harmonic output signals from the athwartships sensing windings of the induction compass transmitter though compensated for vertical field error are still subject to two cycle error which is proportional to the cosine of the bank angle $\phi$. This second harmonic signal is synchronously demodulated in a null balance closed loop demodulating network. The DC output from the demodulator is applied to a negative feedback path in the demodulating network. The negative feedback signal drives current through the sensing winding. At null balance, the effect of the total external field is nullified or cancelled by the feedback current. A multiplying network is provided in the negative feedback path of the demodulator and a correction signal proportional to cos $\phi$ is applied thereto to correct for the effects of the horizontal field perpendicular to the axis of tilt during a turn thereby eliminating two cycle error. The DC output from the demodulating network is therefore proportional to the actual sensed magnetic field.

The novel features which are believed to be characteristic of this invention are set forth with particularity in the appended claims. The invention itself, however, both as to its organization and mode of operation, together with further objectives and advantages, may best be understood by reference to the following description taken in connection with the accompanying drawings in which:

Figure 1:
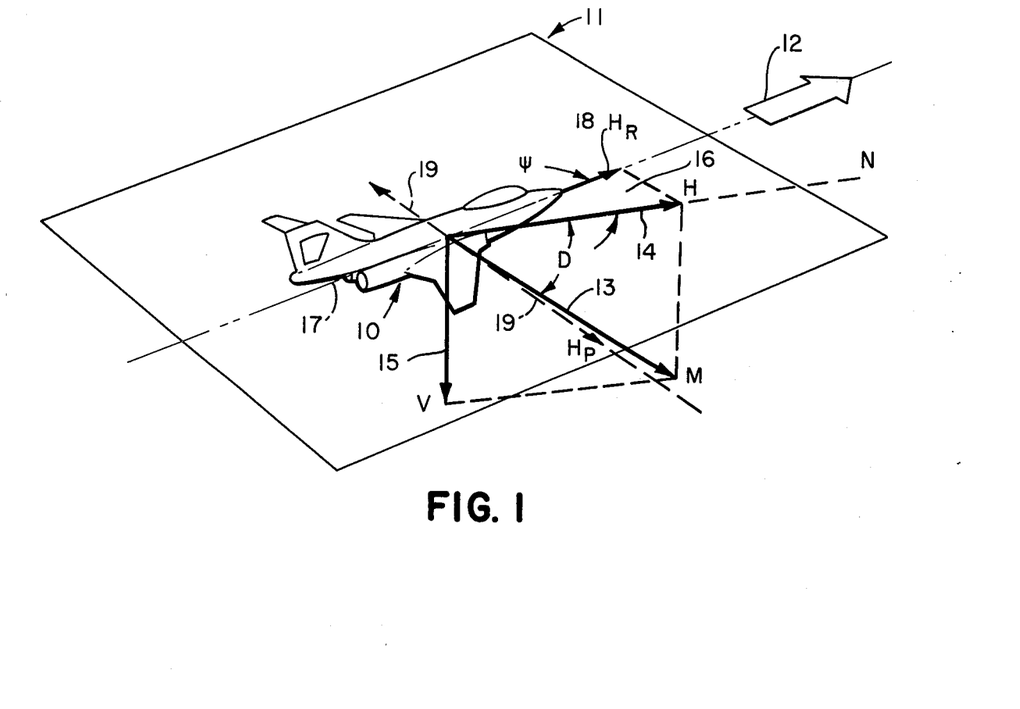
FIG. 1 is a perspective depiction of an aircraft during level flight in the horizontal plane and shows the relationship between the Earth's magnetic field M, magnetic dip angle D and the aircraft axes.

In order to understand the manner in which the instant invention is utilized to compensate a pendulous induction compass transmitter to reduce or eliminate heading errors caused by the vertical and horizontal components of the Earth's magnetic field, it will be useful to discuss initially the relationship between the Earth's magnetic field and the magnetic field components sensed by a pendulous induction compass both in level flight and during a turn when tilting of the aircraft axis and of the compass transmitter produces changes in the sensed field. Thus, FIG. 1 illustrates an aircraft 10 in level flight in the horizontal plane (illustrated generally at 11) in a direction shown by the arrow 12, which in the particular instance, is shown to be a westerly heading with respect to magnetic north N. The heading indicated by a pendulous induction compass transmitter under non-accelerating straight flight, (for all pitch angles within the degree of freedom of tilt for the particular transmitter) represents the direction of the aircraft with respect to the north directed horizontal component H of the Earth's magnetic field M. The Earth's magnetic field M is a vector quantity shown at 13 consisting of a north directed horizontal component H shown at 14 and a vertical component V shown at 15. The angle measured from the horizontal component H to the Earth's magnetic field vector M is termed the dip angle D, with the dip angle being considered positive when the Earth's magnetic field dips below the horizontal as it does in the Northern Hemisphere. Consequently, the vertical component V of the Earth's field is considered positive when directed downward. The direction of the Earth's magnetic field, i.e., the dip angle D, varies with latitude with the dip angle being zero (0°) at the magnetic equator and becoming 90° at the North magnetic pole. The analytical relationship between the Earth's magnetic field and the horizontal and vertical components are therefore as follows:

$$H = M \cos D \qquad (1)$$

$$V = M \sin D \qquad (2)$$

$$\text{Tan } D = V/H \qquad (3)$$

Aircraft magnetic heading is defined as the horizontal angle $\psi$ (positive in a clockwise direction from North) shown generally at 16 between the horizontal projection of the aircraft fore/aft or roll axis, shown at 17 and magnetic North. The horizontal component H of the Earth's magnetic field may, in turn, be resolved along the aircraft axes as two orthogonal horizontal components $H_R$ and $H_P$ which are a function of magnetic heading angle $\psi$. $H_R$ is a component parallel to the horizontal projection 17 of the aircraft fore/aft or roll axis and is shown generally by the arrow 18 and is considered positive when directed forward. $H_P$ is a component parallel to the horizontal projection of the aircraft athwartships or pitch axis shown by the arrow 19. $H_P$ is considered positive when directed to port. With the westerly heading shown in FIG. 1, the sensed athwartships component is directed to starboard and is therefore considered to be negative.

The analytical relationships between the orthogonal horizontal field components $H_P$ and $H_R$ along the aircraft axes, the heading angle $\psi$, and the horizontal component H of the Earth's magnetic field may be defined as follows:

$\psi$ = actual magnetic heading $$H_P = H \sin \psi \qquad (4)$$

$$H_R = H \cos \psi \qquad (5)$$

$$\text{Tan} \psi = H_P/H_R \qquad (6)$$

The heading indicated by an induction compass transmitter may be generally represented by the arc tangent of the athwartships (positive to port) component A of the Earth's magnetic field divided by the fore/aft (positive forward) component F of the Earth's magnetic field as sensed in the plane of the compass transmitter windings. When the aircraft is in level flight, in the horizontal plane, as shown in FIG. 1, the two orthogonal components of the horizontal field H are sensed accurately and produce an accurate magnetic heading indication. It can also be appreciated that with the aircraft in level flight the vertical component V, as illustrated at 15 is at right angles to the compass transmitter sensing windings and is not sensed and therefore has no effect on the indicated magnetic heading.

Figure 2:
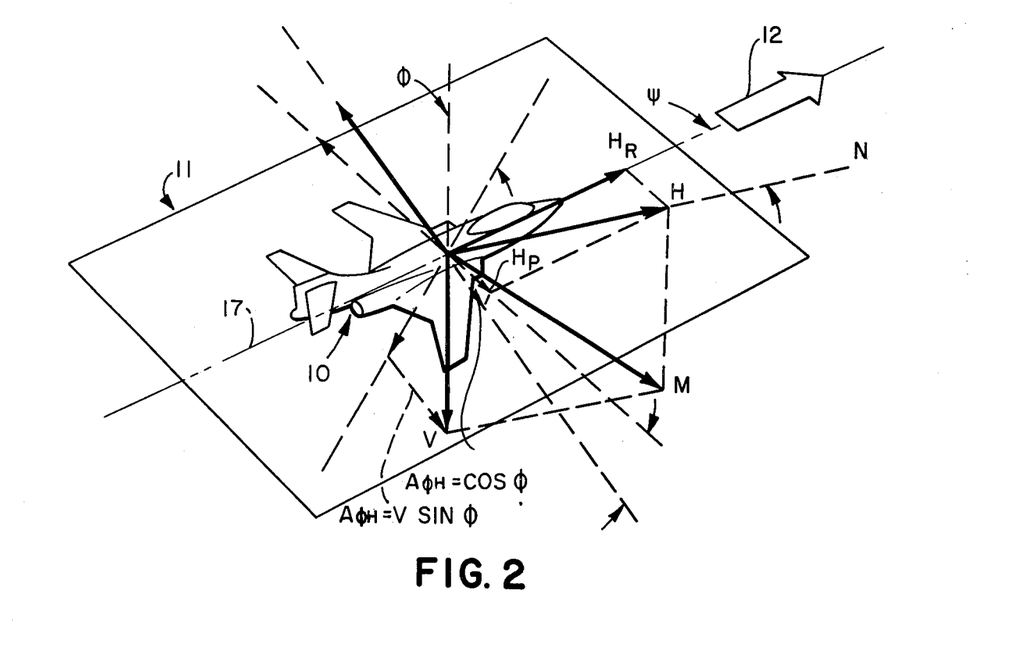
FIG. 2 is a perspective depiction of the aircraft during a coordinated turn and showing the effect of the turn on the relationship of the magnetic field components sensed by the compass transmitter, the aircraft axes, and the Earth's magnetic field.

FIG. 2 illustrates the effect on the sensed magnetic field components as the aircraft goes into a level turn, i.e., the aircraft is making a coordinated turn without either diving or climbing. Thus, aircraft 10 is shown as having rotated about roll axis 17 through a positive bank angle $\phi$ $\phi$ initiating a right turn away from its previous heading shown by arrow 12 and toward magnetic north. With an aircraft bank angle $\phi$ the transmitter is tilted through angle $\phi$ and the windings which sense the athwartships component A now sense a horizontal component which is reduced in magnitude by the cosine of the bank angle $\phi$. The athwartships component $A_{\phi H}$ due to the Earth's horizontal field component is now:

$$A_{\phi H} = H_P \cos \phi \qquad (7)$$

The horizontal component $H_R$ sensed along the fore-/aft axis remains the same (i.e., a function of the sine of the heading angle $\psi$ since the turn is a level turn so that the pitch angle $\theta = 0$.

With the transmitter tilted to back angle $\phi$, the vertical component V of the Earth's field is no longer perpendicular to the plane of the athwartships sensing windings and a component of the vertical field V is sensed along the aircraft athwartships axis and is proportional to the product of V and the sine of bank angle $\phi$. As shown in FIG. 2, for right wing down bank (i.e., $\phi$ is positive) this component, $A_{\phi V}$, is directed along the starboard axis and therefore is considered to be negative. It will be understood that for a left wing down bank (i.e., $\phi$ is negative) the vertical field component is directed to port and therefore will be positive. Thus, $A_{\phi V} = -V \sin \phi$. The total athwartships component $A_\phi$ sensed in the tilted plane of the compass transmitter for a bank or tilt angle $\phi$ is therefore defined as follows:

$$A_\phi = A_{\phi H} + A_{\phi V} = H_P \cos \phi - V \sin \phi \qquad (8)$$

$$A_\phi = H \sin \psi \cos \phi - V \sin \phi \qquad (9)$$

The fore/aft component sensed by the transmitter is not affected by the vertical component of the Earth's field in a level turn and remains:

$$F_\phi = H_R = H \cos \psi \qquad (10)$$

The subscript $\phi$ is used to represent bank tilt only.

As pointed out previously, the tangent of the indicated flux valve heading, $\psi_\phi$ then becomes:

$$\text{Tan } \psi_\phi = \frac{A_\phi}{F_\phi} = \frac{H \sin \psi \cos \phi - V \sin \phi}{H \cos \psi} \qquad (11)$$

$$\text{Tan } \psi_\phi = \text{Tan } \psi \cos \phi - \frac{V \sin \phi}{H \cos \psi} \qquad (12)$$

Substituting Equation (3) into Equation (12) the indicated flux valve heading then becomes:

$$\text{Tan } \psi_\phi = \text{Tan } \psi \cos \phi - \frac{\text{Tan } D \sin \phi}{\cos \psi} \qquad (13)$$

The first expression Tan $\psi$ cos $\phi$ on the right hand side of Equation (13) contains the two cycle error in that it is a function both of the heading angle $\psi$ and the bank angle $\phi$. The second expression on the right hand side represents the vertical field error and it is a function of the dip angle D; i.e., vertical field error $$= -\text{Tan } D \frac{\sin \phi}{\cos \psi} \qquad (14)$$

Since dip angle varies with latitude from 0° at the equator to 90° at the magnetic North Pole, the vertical field error can vary substantially and produce turning problems.

These problems can be generally divided into two different but similar categories. One set of problems occurs if the bank angle equals or exceeds a critical value, namely the complement of the magnetic dip angle. In such an instance, it is not possible to find and indicate all headings as the compass transmitter only indicates a limited range of headings no matter what the actual heading is. Even if the bank angle is less than the critical value, the vertical field error causes oscillations about the desired heading when attempting to straighten out to a more northerly heading or to a direct North heading.

For bank angles equal to or greater than the critical angle, the problem is most severe when an aircraft is on a direct East (90°) or West (270°) heading and tries to turn to another heading. In an East or West heading the sensed fore/aft component F or the horizontal field obviously goes to zero. The sensed athwartships component A can, with certain bank and dip angles, be so affected by vertical field errors as to cancel the Earth's North directed horizontal field component so that the induction compass transmitter is temporarily incapable of sensing and indicating any magnetic heading angle. As a result, the aircraft will not be able to turn toward a specific heading. That is, the sensed vertical field component is equal and opposite to the Earth's horizontal magnetic field component sensed along the athwartships axis. Consequently, the North directed horizontal magnetic field component seems to disappear resulting in a complete loss of magnetic heading or heading may reverse 180°. As pointed out above, for direct East and West headings, the fore/aft component $F_\phi = 0$. Under these circumstances, the value of the sine of the heading angle is (East $\psi = 90°$) $\sin \psi = \sin 90° = +1$ and for (West $\psi = 270°$) $\sin \psi = \sin 270° = -1$. Thus, for an East heading the athwartships component A as defined in Equation (9) becomes zero resulting in a loss of heading when the vertical field error $V \sin \phi = H \sin \psi \cos \phi$. Since for East (90°) heading $\sin \psi = +1$, this occurs when:

$$V \sin \phi = H \cos \phi \quad (15)$$

$$\frac{H}{V} = \frac{\sin \phi}{\cos \phi} \quad (16)$$

By trigonometric transformation, Equation (16) becomes:

$$H/V = \tan \phi \quad (17)$$

But, $H/V = \cot D$, so $\cot D = \tan \phi$. But $\cot D = \tan (90° - D)$

Therefore,
$$\tan \phi = \tan (90° - D) \quad (18)$$

or $$\phi = 90° - D \quad (19)$$

In other words, for a given dip angle D, the compass transmitter heading becomes indeterminate in the Northern Hemisphere on an East heading when the angle of bank is a right wing down and equal to the complement of the dip angle. Obviously, if $\phi > 90 - D$ then the indicated heading actually reverses 180°.

Similarly, for a West heading with $\sin \psi = -1$.

$$\tan \phi = -H/V = -\cot D = -\tan (90° - D)$$
$$= \tan - (90° - D) \quad (20)$$

or $$\phi = -(90° - D)$$

Therefore, indicated headings become indeterminate in the Northern Hemisphere when flying East with a right (positive) bank angle equal to the complement of the dip angle or when flying West with a left (negative) bank angle equal to the complement of the dip angle. Further increasing the bank angle results in a reversal of the polarity of the athwartships component $A_\phi$ and produces 180° error in indicated heading for the above conditions. Consequently, the indicating heading appears to modulate around West (270°) during a right wing down turn, and to modulate around East (90°) during a left wing down turn. This results in not being able to turn to indicated headings near East or West without first levelling down to a bank angle which is lower than the complement of the dip angle. For the mid-Eastern U.S. where dip angle is $+70°$, the bank angles must therefore be less than $\pm 20°$ to avoid this problem on the East/West heading.

In addition to the problems encountered in turns when on an East/West heading the so-called "Northerly Turning Error" induces continuous oscillations when attempting to straighten out on a northerly heading when in the Northern Hemisphere, even though the bank angle is less than the complement of the dip angle. Although the errors normally referred to as "Northerly Turning Error," it will be appreciated that it is a hemispherical turning error and that the same problem exists in the Southern Hemisphere when turning to a southerly heading.

For headings other than East or West in which the bank angle exceeds the complement of the dip angle, an induction compass transmitter indicates only a limited and erroneous range of headings.

The nature of the problems may be discerned from Tables I and II which tabulate the indicated heading vis-a-vis the actual heading in case of Table I and magnitude and direction of error in Table II for bank angles of $\pm 15°$ and $\pm 30°$ (below critical) (above the critical angle) for a dip angle of $D = +70°$ which represents a dip angle typical of the Eastern United States.

TABLE I

| Actual Hdg (°) | INDICATED HEADING (Deg.) | | | |
|---|---|---|---|---|
| | +15° Bank | −15° Bank | +30° Bank | −30° Bank |
| 0 | 324.58 | 35.42 | 306.05 | 53.95 |
| 45 | 357.73 | 63.11 | 312.88 | 70.40 |
| 90 | 90.00 | 90.00 | 270.00 | 90.00 |
| 135 | 182.27 | 116.89 | 227.12 | 109.60 |
| 180 | 215.42 | 144.58 | 233.95 | 126.05 |
| 225 | 243.11 | 177.73 | 250.40 | 132.88 |
| 270 | 270.00 | 270.00 | 270.00 | 90.00 |
| 315 | 296.89 | 2.27 | 289.60 | 47.12 |

Table II which, in turn, is derived from Table I indicates the magnitude and sign of the heading errors in degrees (°) for various headings and for the various bank angles.

TABLE II

| Actual Hdg (°) | INDICATED HEADING (Deg.) | | | |
|---|---|---|---|---|
| | +15° Bank | −15° Bank | +30° Bank | −30° Bank |
| 0 | −35.42 | 35.42 | −53.95 | 53.95 |
| 45 | −47.27 | 18.11 | −92.12 | 25.40 |
| 90 | 0.00 | 0.00 | ±180.00 | 0.00 |
| 135 | 47.27 | −18.11 | 92.12 | −25.40 |
| 180 | 35.42 | −35.42 | 53.95 | −53.95 |
| 225 | 18.11 | −47.27 | 25.40 | −92.12 |

TABLE II-continued

| Actual Hdg (°) | INDICATED HEADING (Deg.) | | | |
|---|---|---|---|---|
| | +15° Bank | −15° Bank | +30° Bank | −30° Bank |
| 270 | 0.00 | 0.00 | 0.00 | ±180.00 |
| 315 | −18.11 | 47.27 | −25.40 | 92.12 |

As may be seen from Table I, for a right wing down turn in which the bank angle $\phi$ exceeds the complement of the dip angle (i.e., $\phi = \pm 30°$), the compass transmitter heading indications are limited to the range 227°–312°. Thus, for any actual heading 0°–360°, the indicated headings are roughly accurate (though still in error) over a limited range extending generally between South-West (225°) and North-West (315°) heading. Similarly, for a left wing down turn (with a bank angle $t\phi = -30°$) the compass transmitter indications are limited to the range 47°–132°, i.e., roughly between North-East (45°) and South-East (135°). Thus, it can be seen that vertical field error introduces serious ambiguities and anomalies on all indicated headings from a compass transmitter during turns when the bank angle equals or exceeds the complement of the dip angle.

Tables I and II illustrate ambiguities and anomalies for the particular dip and bank angles described, i.e., $\phi = \pm 30°$ and $D = +70°$.

Obviously, for different combinations of dip and bank angles, the indicated headings and heading errors will vary. However, "Northerly Turning Error" ambiguities and anomalies of the sort just described exist to varying degrees whenever the bank angle equals or exceeds the complement of the dip angle.

As pointed out previously, "Northerly Turning Error" due to the Earth's vertical field can also result in continuous oscillation about a desired heading when attempting to straighten out on a northerly heading in the Northern Hemisphere even though the bank angle is less than the complement of the dip angle. This oscillatory "Northerly Turning Error" can also be illustrated by reference to Table I. For bank angles of $\pm 15°$, let it be assumed that the system is being operated in the compass mode, i.e., not slaved to a directional gyro. For a $+15°$ bank, i.e., a right wing down turn from a westerly heading towards North, the craft must turn to an approximate 45° actual heading for the compass to have an indicated heading of approximately 0° (i.e., 357.73°). Upon levelling out, however, the compass indicates the actual heading which, as pointed out, is 45° to the East of magnetic North. This informs the pilot that a left bank turn is needed to obtain a North heading. During a subsequent $-15°$ bank, the aircraft turns to an actual heading of approximately 315° because at that heading, the indicated heading for a $-15°$ bank is approximately 0° (i.e., 2.27°). Upon levelling out, the now correct indication of 315° will inform the pilot that he is now to the West of magnetic North and that a right bank turn is needed to obtain a North heading. Thus, oscillatory condition is established which makes it very difficult to turn to and level out on a North heading or a more Northerly heading.

Thus, it can be seen that magnetic compass systems and systems in which a directional gyro is slaved to a magnetic compass system are subject to errors induced by the vertical component of the Earth's magnetic field due to acceleration in turns; errors which are customarily called "Northerly Turning Errors." The term "Northerly Turning Error" is somewhat of a misnomer in that the problem exists with a South Heading when in the Southern Hemisphere. A more accurate description of a phenomenon would be "Hemispherical Turning Error." However, it is commonly referred to as "Northerly Turning Error" and when thus referred to in the context of this specification, it will be understood that it is not limited to the Northern Hemisphere but is simply a turning error for a pendulous induction compass transmitter due to the vertical component of the Earth's field during turns.

The oscillatory condition which exists as the pilot tries to turn to a Northerly heading in the Northern Hemisphere is not present when turning to a southerly heading in the Northern Hemisphere. That is, Table I makes it clear that this oscillatory or overshoot instability does not occur for a southerly heading since the compass indicated heading will show 180° before that heading is actually reached. That is, while trying to turn to a southerly heading in the Northern Hemisphere, the error introduced by the vertical component of the Earth's field causes an undershoot rather than an overshoot. As a result, although the compass transmitter provides erroneous indications which introduce some difficulties, the fact that the error results in undershoot allows the pilot, by continuing to bank, to reach the southerly heading in the Northern Hemisphere.

As has been shown previously in Equation (8), vertical field error along the athwartships axis during a turn is equal to $V \sin \phi$. As a result, the indicated heading which is represented by the arc tangent of the athwartships component $A_\phi$ divided by the fore/aft component $F_\phi$ has an error term proportional to Tan D; i.e., the tangent of the dip angle. Since dip angle varies with latitude, substantial errors in indicated heading, as shown in Tables I and II are present and result in "Northerly Turning Error." Applicant has found that the vertical field error can be substantially eliminated by generating a compensating signal which is utilized to generate a flux in the transmitter sensing winding which cancels the vertical field error.

The Earth's vertical field component is defined as $V = M \sin D$, where M is the Earth's magnetic field and D is the dip angle. The vertical field error $-V \sin \phi$ thus may be defined as:

$$-V \sin \phi = -M \sin D \sin \phi \tag{21}$$

Thus, by adding a signal equal to $M \sin D \sin \phi$ to the athwartships component $A_\phi$, $A_\phi$ is modified to become $A_{\phi C}$, i.e., the compensated athwartships component $$A_{\phi C} = H \sin \psi \cos \phi - V \sin \phi + M \sin D \sin \phi \tag{22}$$

$$A_{\phi C} = H \sin \psi \cos \phi \tag{23}$$

As a result, in Equation (13) the tangent of $\psi_\phi$ becomes:

$$\text{Tan } \psi_{\phi C} = \text{Tan } \psi \cos \phi \tag{24}$$

It can be seen from Equation 24 that the indicated heading now only contains a two cycle error proportional to $\cos \phi$ which is relatively small and does not vary with latitude. As a result, there is no error due to the Earth's vertical field component and "Northerly Turning Error" is eliminated.

Although two cycle error is relatively small since it does not vary with latitude, there may be occasions when there is a need to eliminate even this relatively minor source of heading errors. This may readily be achieved by processing the corrected athwartships component $A_{\phi C}$ so that the error inducing $\cos \phi$ factor is eliminated. By multiplying the corrected signal $A_{\phi C}$ by a $(1/\cos \phi,)$ $A_{\phi C}$ is modified to become $A_{\phi CC}$.

$$A_{\phi CC} = H \sin \psi \cos \phi \, (1/\cos \phi) \quad (25)$$

$$A_{\phi CC} = H \sin \psi \quad (26)$$

As a result, the tangent of $\psi_{\phi C}$ as defined by Equation (24) becomes $$\text{Tan } \psi_{\phi CC} = \text{Tan } \psi \quad (27)$$

Figure 3:
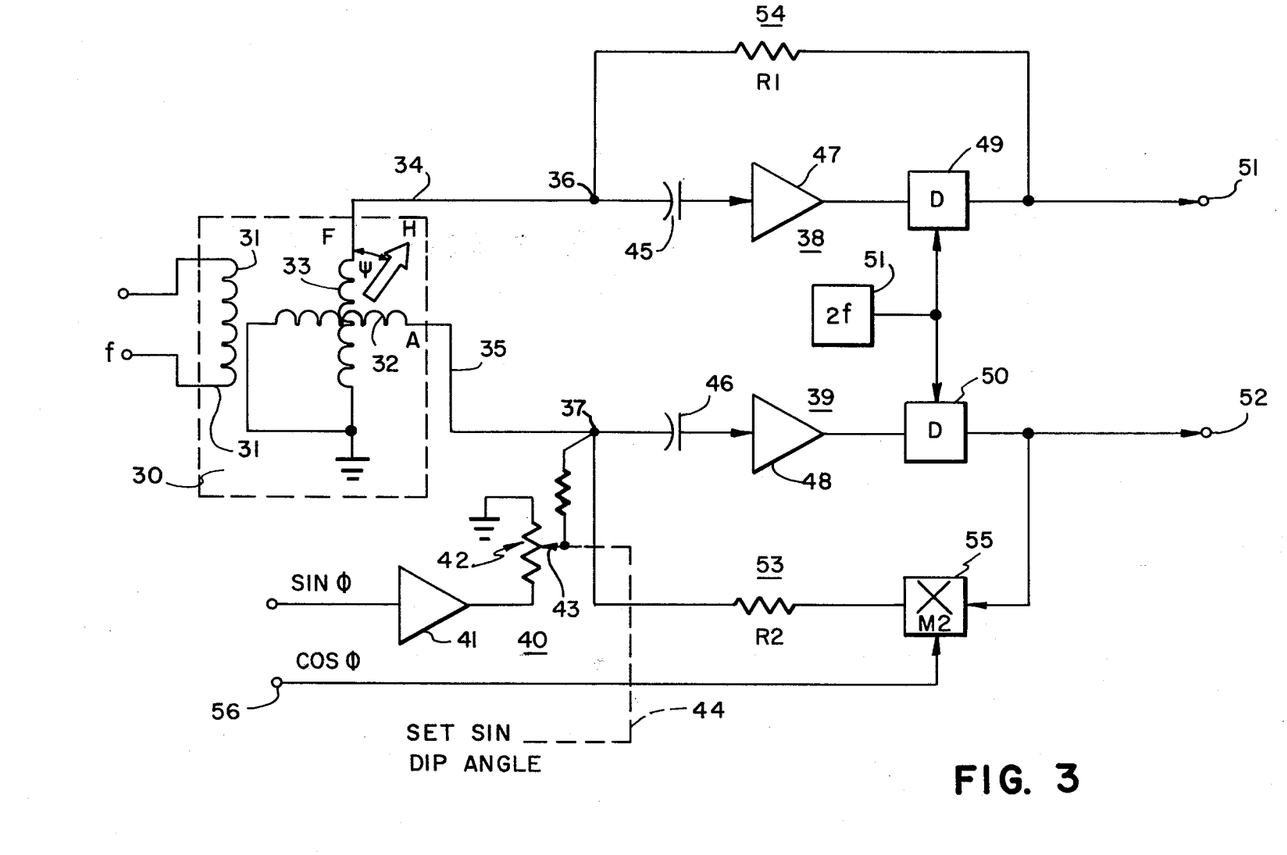
FIG. 3 is a schematic illustration of a pendulous induction compass transmitter which is compensated for vertical field error and two cycle error by current injection through the transmitter windings.

FIG. 3 illustrates one embodiment of an arrangement for compensating the output of a pendulous induction transmitter both for errors due to the vertical component of the Earth's field and two cycle error during turns. In the system illustrated in FIG. 3 a compensating signal of magnitude $M \sin D \sin \phi$ is generated to compensate the induction compass transmitter for errors developed during a turn because of the vertical component of the Earth's magnetic field. The compensating signal drives a current through the athwartships sensing windings to cancel the flux field due to the vertical field. A second compensating signal proportional to $(\cos \phi)$ is generated to compensate the output signal for two cycle error. This compensating signal is applied to the negative feedback path of a null balanced demodulating network to cancel two cycle error.

No compensation is required for the output signal from the transmitter winding which senses the fore/aft component of the Earth's field since these sensing windings are not subject to vertical field or two cycle errors during turns.

Thus, in FIG. 3, a pendulous induction compass transmitter is illustrated schematically at 30. Transmitter 30 includes an excitation winding 31 having an alternating excitation voltage (commonly at 400 Hz) applied thereto to saturate a magnetic core structure twice during each excitation voltage cycle. A plurality of sensing windings 32 and 33 are wound on the magnetic core structure. Saturation of the core twice during each excitation voltage cycle results in the Earth's field inducing second harmonic, carrier suppressed, double sideband signals in these windings which are proportional to the fore/aft and athwartships components of the Earth's field sensed by these windings. Windings 32 and 33 are connected in a typical resolver configuration with winding 32 sensing the athwartships component A of the Earth's horizontal magnetic field H and winding 33 sensing the fore/aft component F. The second harmonic outputs from compass transmitter 30 are applied via leads 34 and 35 as one input to junctions 36 and 37. The other input to junctions 36 and 37 is from the negative feedback paths of the harmonic, null balanced, demodulating channels 38 and 39. Junction 37 also has an input from turn compensating network 40 which produces a DC compensating signal proportional to $M \sin D \sin \phi$ to drive a compensating current through windings 32 and cancel the effect on that winding of the vertical component of the Earth's magnetic field during a turn.

One input to vertical field compensating network 40 is a varying DC voltage from the vertical roll gyro which is proportional to the sine of the bank angle $\phi$. This signal is applied to an amplifier 41 which amplifies $\sin \phi$ and also introduces a scale factor proportional to the Earth's magnetic field M so that the output from amplifier 41 is a signal proportional to $M \sin \phi$. This signal is applied as a DC supply voltage for potentiometer 42 which has a movable wiper 43 controlled by shaft 44. Wiper 43 is positioned by shaft 44 so as to insert a sine term. The voltage at wiper 43 is therefore equal to the product of the sin of the bank angle $\phi$, the Earth's magnetic field M, and the sin of dip angle D (i.e., = $M \sin D \sin \phi$). Potentiometer wiper 43 may be set manually or alternatively, it may be automatically programmed as a function of latitude and longitude. In the latter case, the compensation signal is obtained by applying the programmed sin D signal, and the $M \sin \phi$ signal to a suitable multiplier.

If the aircraft or vehicle is to traverse a relatively small distance in latitude so that the dip angle stays relatively constant the output of potentiometer 42 may be adjusted initially by moving the wiper so that for any given bank angle, the output exactly cancels the vertical field error and no further adjustment is then required. When the aircraft is likely to fly over a large distance, so that the dip angle changes substantially, changes in the wiper position by the pilot will be necessary to maintain proper compensation. The pilot would be provided with wiper settings for any given latitude. Potentiometer 42 may be a linear potentiometer which has sinusoidal scale calibrations. Alternately, a sinusoidally wound potentiometer with a linear scale may be utilized instead.

The output from potentiometer wiper 43 is applied through a current limiting resistor to junction 37. The compensating signal, as pointed out previously, drives current through athwartships winding 32 to produce a flux field which opposes and cancels the flux due to the vertical component of the Earth's field. As a result, any signal which would be induced in these windings due to the vertical component of the Earth's magnetic field during turns is cancelled. The output from the winding now contains only two cycle error.

The compensated output signal from summing node 37 and the fore/aft signal from node 36 are applied to second harmonic, null balanced, demodulator channels 38 and 39 respectively, where they are demodulated. The demodulated signals are converted to negative, DC feedback currents which are then driven through the respective windings.

The negative feedback currents from demodulating channels 38 and 39 produce flux fields which tend to cancel the effect of the external horizontal field H. As a result, when the null balance conditions exist, the DC voltages at the output terminals 51 and 52 of demodulating channels 38 and 39 are exactly proportional to the voltage induced in the compass transmitter by the remaining external magnetic field. That is, at null balance the negative feedback current required to cancel the flux field due to the external magnetic field is a measure of the external field and the demodulator voltage required to generate the null balance current is also proportional to the external field.

The apparatus for obtaining a demodulated output from an induction compass transmitter using a second harmonic, null balancing technique is described and claimed in a copending patent application entitled "Null Balanced Second Harmonic Induction Compass Transmitter" Ser. No. 729,136, Filed: Oct. 4, 1976 in the name of Gerald Leslie Sullivan and assigned to the General Electric Company the assignee of the present invention.

As pointed out in that application, in an induction compass transmitter, the magnitude and direction of an external field relative to the flux collectors is sensed by the windings mounted on the flux collector whose magnetic states are biased by the external field. The biasing action results in generation of signals in the associated magnetometer windings which are proportional to the external field. These signals are second harmonic double sideband, carrier suppressed signals. This process can be reversed and DC magnetic fields can be generated in the flux collector by supplying a DC current to the signal windings. If such a DC current is supplied to the signal windings a similar second harmonic output will result. If the current driven through the windings is of a magnitude and polarity such as to produce a flux field which cancels the external field and nullifies the second harmonic signal which would normally be induced by the external field, then the DC current which is driven through the windings to produce the cancelling flux is a measure of the external field strength. Consequently, the DC voltage necessary to produce the cancelling current is similarly related to the external field.

In null balanced demodulating networks 38 and 39, the demodulated second harmonic output signals from the induction compass transmitter, after modification by the vertical field compensating signal in the athwartships channel, are used as a source of the cancelling currents. That is, after amplifying and demodulating each second harmonic signal output from the compass transmitter, the negative feedback paths 53 and 54 from the output to the input of the demodulator generate DC cancelling currents for the compass induction transmitter. To this end, the second harmonic output signals from induction compass transmitter 30 appearing at the output of junctions 36 and 37 are applied through blocking capacitors 45 and 46 to a high gain amplifiers 47 and 48. The gain of amplifiers 47 and 48 is made very high so that the entire loop gain is high. The amplified second harmonic signals are applied as one input to synchronous demodulators 49 and 50 in the respective demodulating networks. A local, second harmonic, reference carrier signal from reference carrier signal source 51 is applied as the other input to demodulators 49 and 50. That is, if the excitation voltage for compass transmitter 30 is a 400 Hz alternating voltage the output signal from the compass transmitter is then a double sideband, suppressed carrier, second harmonic signal. By reinserting a second harmonic carrier signal, the modulated second harmonic signals from the transmitter are demodulated. By reinserting a carrier signal of twice the frequency, i.e., 800 Hz, demodulators 49 and 50 demodulate the carrier suppressed, double sideband signal to produce varying output voltages. In the case of channel 38 the varying output voltage is proportional to the fore/aft component of the Earth's horizontal field and in the case of channel 39 it is proportional to the athwartships component of the Earth's horizontal field.

The output signal from channel 38 is an accurate measure of the Earth's magnetic horizontal field sensed along the fore/aft axis both in level flight and during turns. However, the output of demodulator channel 39 which is the Earth's magnetic field as sensed along the athwartships axis of the craft, though compensated for errors induced by the vertical component of the Earth's magnetic field during turns still is subject to two cycle error. Thus, the output of demodulation channel 39 is a signal proportional to $H \sin \psi \cos \phi$.

Compensation for two cycle error during turns in the sensed athwartships component of the Earth's field is accomplished by further processing of the demodulated output signal. Thus, the varying DC output signal from demodulator 50 in athwartships demodulating channel 39 which is still subject to two cycle error is fed back via feedback path 53 to summing node 37. According to the invention, two cycle error is cancelled in the negative feedback path by inserting a two cycle error compensating signal proportional to $\cos \phi$ and multiplying the DC signal applied to the negative feedback path by the compensating signal to produce a varying DC voltage which cancels out two cycle error. To this end, a multiplier 55 is provided in negative feedback path 54 of demodulating channel 39. One input to multiplier 55 is the varying DC output voltage from demodulator 50. The other input to the multiplier is a signal proportional to $\cos \phi$ which may be obtained at terminal 56 from the same vertical roll gyro which provides the $\sin \phi$ signal for compensation network 40.

In any closed loop network with negative feedback the transfer function output/input or C/R is a function of the gain G and the negative feedback H. Thus, $$\frac{C}{R} = \frac{G}{1 + GH}$$

If $G >>> 1$, which is the case if the amplifier gain is large, then $GH >>> 1$ and the transfer function becomes:

$$\frac{C}{R} = \frac{1}{H} \text{ (i.e., } \frac{C}{R} = \frac{G}{GH} = \frac{1}{H} \text{)}.$$

If the negative feedback H is multiplied by the factor $\cos \phi$ and $\cos \phi < 1$, H is is reduced. This condition exists if the plane is not in level flight since $\phi = 0°$ and $\cos \phi = 1$ only in level flight. For any angle of back $\cos \phi < 1$. Since the transfer function is inversely proportional to negative feedback H, any reduction of H by multiplying by $\cos \phi$ which is $< 1$ obviously results in increasing the output by a corresponding $\cos \phi$ factor thereby cancelling two cycle error. Thus, when the second harmonic demodulator network 39 is at null balance the DC output of channel 39 is compensated for errors due to the vertical component of the Earth's magnetic field and two cycle error and is therefore a DC voltage proportional to $H \sin \psi$.

In the arrangement illustrated in FIG. 3, exact compensation for vertical field error and two cycle error is provided by generating a compensation signal for vertical field error which is equal to $M \sin D \sin \phi$ and a signal proportional to $\cos \phi$ for two cycle error.

While a number of specific embodiments of this invention have been shown and described above, it will, of course, be understood that the invention is not limited thereto since many modifications both in the circuit arrangement and in the instrumentalities employed therein may be made. It is contemplated by the appended claims to cover any such modifications which fall within the true spirit and scope of this invention.

What is claimed as new and desired to be secured by Letters Patent of the United States is:

1. In a pendulous induction compass transmitter compensated for errors due to the Earth's field and for two cycle errors during turns, the combination comprising:
   (a) magnetic sensing means for producing a first modulated signal responsive to the strength of the Earth's magnetic field along one axis of an aircraft, and for producing a second modulated signal responsive to the strength of the Earth's magnetic field along another axis of the aircraft, (b) means to compensate said signals for errors due to the Earth's vertical field during turns including;
  (1) means to generate a correction signal proportional to the product of the Earth's magnetic field M, the magnetic dip angle, and the bank angle, said correction signal being equal to the vertical field error in the magnetic field sensed along one of the said axes of an aircraft during a turn,
  (2) means responsive to said correction signal to produce a flux field which cancels the flux sensed by said magnetic sensing means due to the Earth's vertical field during turns, (c) means for demodulating the first and second signals including;
  (1) first and second demodulators each having an input and an output associated with the magnetic sensing means to produce, respectively, first and second demodulated signals from said first and second modulated signals,
  (2) feedback paths from the outputs to the inputs of each of said first and second demodulators for producing negative feedback signals, (d) means to correct one of said first and second modulated signals for two cycle error including means to reduce the negative feedback in one of said paths by a factor proportional to the cosine of the bank angle whereby the output signal of the demodulator associated with said one feedback path is increased correspondingly to cancel two cycle error.

2. The pendulous induction compass transmitter according to claim 1 wherein said means to reduce the negative feedback includes,
  (a) multiplying means in said one of said feedback paths and
  (b) means to apply one of said demodulated signals and a signal proportional to the cosine of the bank angle during a turn to said multiplier to reduce the feedback signal by the cosine of the bank angle.

3. The pendulous induction compass transmitter according to claim 1 wherein said first and second modulated signals from said magnetic sensing means are respectively responsive to Earth's magnetic field along the fore/aft and athwartships axes and said correction signal is coupled to said magnetic sensing means to produce flux to cancel the Earth's field sensed by the magnetic sensing means along the athwartships axis.

4. The pendulous induction compass transmitter according to claim 3 wherein said means to reduce the negative feedback includes,
  (a) multiplying means in the negative feedback path for the second demodulator in demodulating the compensated second modulated signal,
  (b) means to apply the demodulated second signal and a signal proportional to the cosine of the bank angle during a turn to said multiplier to reduce the feedback by the cosine of the bank angle.

* * * * *